Patented Nov. 6, 1923.

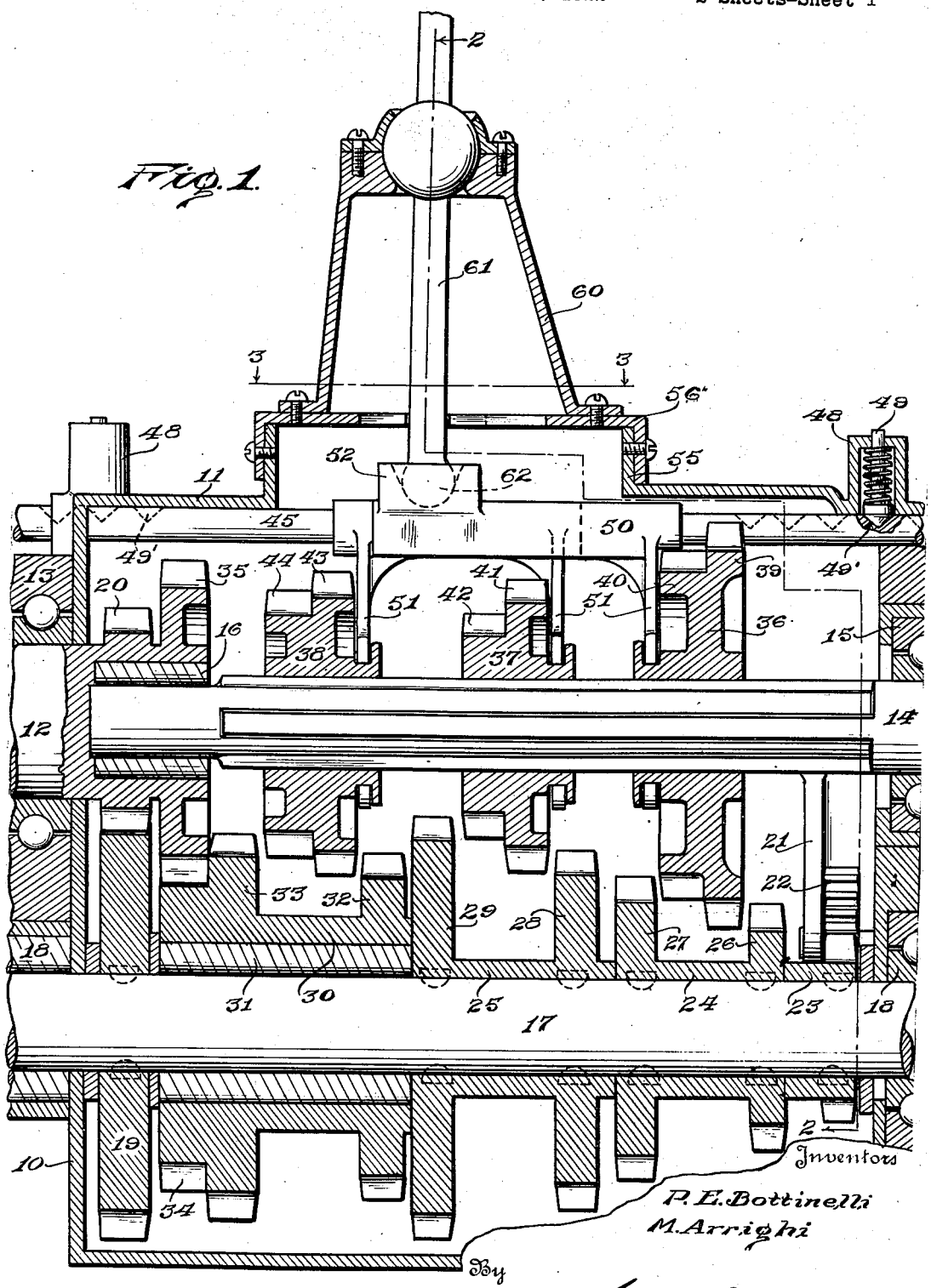

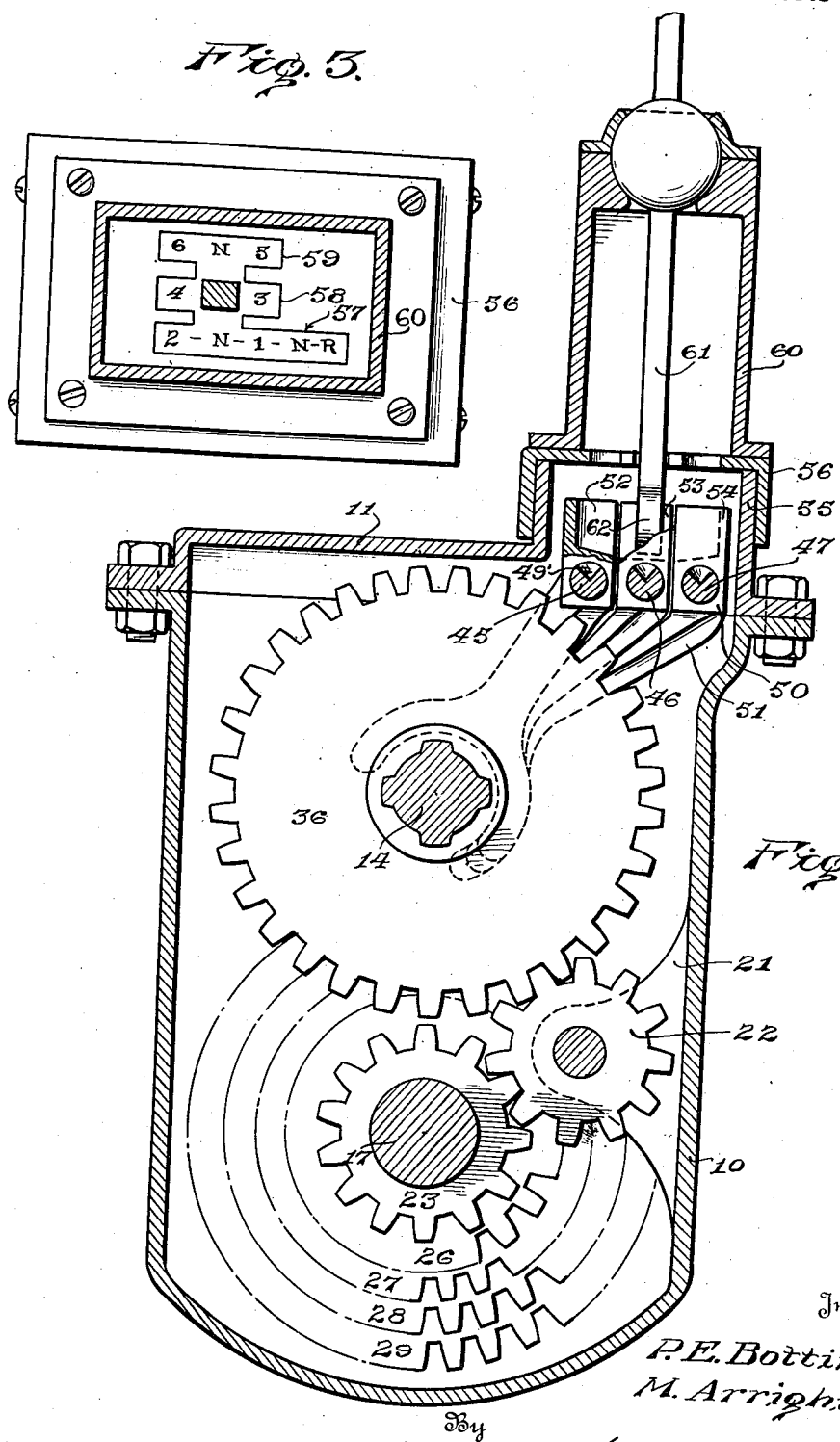

1,473,459

UNITED STATES PATENT OFFICE.

PAUL E. BOTTINELLI AND MAURICE ARRIGHI, OF WEST NEW YORK, NEW JERSEY.

SPEED GEARING.

Application filed April 18, 1922. Serial No. 554,649.

*To all whom it may concern:*

Be it known that we, PAUL E. BOTTINELLI and MAURICE ARRIGHI, citizens of the United States, residing at West New York, in the county of Hudson and State of New Jersey, have invented certain new and useful Improvements in Speed Gearing, of which the following is a specification.

This invention relates to an improved speed gearing for motor vehicles and seeks, as one of its principal objects, to provide a gearing wherein full advantage may be taken of vehicle momentum and the engine speed of the vehicle maintained at a minimum for the work required to thus effect a corresponding saving in fuel.

A further object of the invention is to provide a gearing embodying seven different speeds comprising six speeds forward and one reverse and wherein the gear ratio of said speeds will be so proportioned that a maximum ratio suited to the work to be performed will be available.

And the invention has as a still further object to provide a gearing wherein any one of the several speeds may be readily selected by a single control lever.

Other and incidental objects will appear hereinafter.

In the drawings:

Figure 1 is a longitudinal sectional view through our improved gearing,

Figure 2 is a vertical sectional view on the line 2—2 of Figure 1, looking in the direction of the arrows, and Figure 3 is a detail sectional view on the line 3—3 of Figure 1, looking in the direction of the arrows.

In carrying the invention into effect, we employ a gear case 10 normally closed by a cover 11 and extending into the gear case at one end thereof is a drive shaft 12 journaled by an appropriate bearing 13. Extending through the opposite end of the case in alinement with the drive shaft is a driven or propeller shaft 14 supported by an appropriate bearing 15 and journaled at its forward end in the adjacent end of the shaft 12 by an anti-friction bearing 16. Arranged beneath the shaft 14 is a countershaft 17 journaled in appropriate bearings 18 upon the gear case and fixed upon this shaft is a gear 19 constantly in mesh with a gear 20 upon the drive shaft 12 so that the drive shaft and the countershaft are thus caused to turn in unison. Projecting from one side wall of the gear case adjacent the rear end thereof is a bracket 21 supporting a reverse gear 22 and keyed upon the shaft 17 to constantly mesh with the reverse gear is a gear 23 so that the reverse gear will be constantly driven. Keyed upon the shaft 17 in advance of the gear 23 are compound gear elements 24 and 25 respectively, the gear element 24 comprising a low or first speed gear 26 and a second speed gear 27 while the gear element 25 comprises a third speed gear 28 and a fourth speed gear 29. In advance of the gear element 25 is a compound gear element 30 which lies between the former gear element and the gear 19 and is journaled upon the shaft 17 by an appropriate anti-friction bearing 31 surrounding the shaft, the gear element 30 being thus free on the shaft. This gear element includes a fifth speed gear 32 and a sixth speed gear 33 as well as a gear 34 constantly in mesh with a gear 35 on the drive shaft 12. Thus, the gear element 30 will be constantly driven by the drive shaft. Splined upon the driven shaft 14 are compound gear elements 36, 37 and 38, respectively. Each of these gear elements comprises a pair of gears, the gears of the element 36 being indicated at 39 and 40, the gears of the element 37 at 41 and 42, and the gears of the element 38 at 43 and 44, respectively.

Mounted upon the cover 11 of the gear case are longitudinally disposed parallel shifter rods which, for convenience, have been indicated at 45, 46 and 47, respectively. These rods are slidable longitudinally upon the cover and upstanding from the cover at its ends are bosses 48 in which are mounted spring pressed detents 49 engageable in suitable sockets 49' in the rods for locking the rods when shifted. Fixed upon the rods are sleeves 50 from which extend forks 51 engaging the gears 36, 37 and 38, and formed on said sleeves are upstanding sockets which, for convenience, have been indicated at 52, 53 and 54 respectively. As shown in Figure 1, these sockets stand in alinement in the neutral position of the gears while, as brought out in Figure 2, the socket 53 is open at its sides so as to communicate with the sockets 52 and 54 when in alinement therewith. Formed in the cover plate 11 is an opening about which is an upstanding flange 55 and secured to said flange is a closure plate 56 in which is formed a slot of the configuration illustrated in Figure 3 of the drawings. As illustrated, this slot is provided with communicating portions 57, 58 and 59 respectively, the portion 57 of the slot being somewhat longer than the other portions thereof. Secured upon the closure plate 56 is an upstanding lever support 60 and mounted for universal movement upon said support is a control lever 61 extending through the slot in the plate 56 and provided at its lower end with a head 62 selectively engageable in the sockets 52, 53 and 54 of the sleeves of the shifter rods.

As will now be readily understood in view of the preceding description, the lever 61 may be tilted for moving the lower end of the lever into any one of the portions 57, 58 and 59 of the slot in the plate 56 and selectively engaging the head in the sockets 52, 53 and 54 of the shifter rods when the lever may be rocked for individually shifting the rods. As particularly brought out in Figure 1, rearward movement of the rod 45 will serve to engage the gear 39 of the gear element 36 with the gear 26 upon the countershaft, giving first speed. Continued rearward movement of the rod will then shift the gear element 36 to neutral position when the rod may be further moved rearwardly to engage the gear 39 with the reverse gear 22, giving reverse. On the other hand, the gear element 36 may be moved forwardly from its normal position, as shown in Figure 1, to engage the gear 40 with the gear 27 of the gear element 24, giving second speed. Thus, as will be perceived, five different positions are provided for the gear element 36 and accordingly, the shifter rod 45 is formed with five of the sockets 49' so that the gear will be held in each of said positions. Similarly, the rod 46 may be moved rearwardly for shifting the gear element 37 to engage the gear 41 thereof with the gear 28 of the gear element 25, giving third speed, or may be moved forwardly to engage the gear 42 of the gear element 37 with the gear 29, giving fourth speed. In like manner, the rod 47 may be moved rearwardly for shifting the gear element 38 to engage the gear 43 thereof with the gear 32 of the gear element 30, giving fifth speed, or may be moved forwardly for shifting the gear element 38 to engage the gear 44 thereof with the gear 33, giving sixth speed. As will be noted, three positions are thus provided for each of the gear elements 37 and 38 and accordingly the rods 46 and 47 are each provided with three of the sockets 49' so that said gear elements will be held in each of the positions thereof. Thus, as will be seen, any one of the several speeds may be readily selected by means of the single control lever. When compared with a typical speed gearing as now in common use, the reverse and first speed of the present gearing maintain substantially the same average ratio employed for first speed and reverse of such typical gearing. However, the second speed of the present gearing is slightly lower and third speed is slightly higher than second speed of the typical gearing so as to permit climbing of hills at moderate engine speed, while the fourth speed of the present gearing is slightly higher than the third speed of the typical gearing. Fifth speed is slightly above a direct drive while sixth speed is considerably above a direct drive. Thus, a relatively wide range of gear ratios is provided.

Having thus described the invention, what is claimed as new is:

1. In a speed gearing, the combination of a drive shaft, a driven shaft, a countershaft constantly rotated by the drive shaft at a fixed speed, a gear free on the countershaft and constantly rotated by the drive shaft at a fixed speed, and a gear on the driven shaft shiftable to engage said first mentioned gear.

2. In a speed gearing, the combination of a drive shaft, a driven shaft, a countershaft constantly rotated by the drive shaft, a compound gear element free on the countershaft constantly driven by the drive shaft and including spaced gears, and a compound gear element shiftable on the driven shaft to coact with the first gear element and including gears each engageable with one of the gears of the first gear element respectively.

3. In a speed gearing, the combination of a drive shaft, a driven shaft, a countershaft constantly rotated at a fixed speed by the drive shaft, a gear free on the countershaft constantly rotated by the drive shaft at a fixed speed, and means for selectively rotating the driven shaft from the countershaft or from the free gear thereon.

4. In a speed gearing, the combination of a drive shaft, a driven shaft, a countershaft constantly rotated by the drive shaft, a compound gear element fixed upon the countershaft and including first and second speed gears, another compound gear element fixed on the countershaft and including third and fourth speed gears, a compound gear element shiftable upon the driven shaft and including gears respectively engageable with the first and second speed gears selectively, and another compound gear element upon the driven shaft and including gears respectively engageable with the third and fourth speed gears selectively.

5. In a speed gearing, the combination of a drive shaft, a driven shaft, a countershaft constantly rotated by the drive shaft, a compound gear element fixed on the countershaft and including first and second speed gears, another compound gear element fixed upon the countershaft and including third and fourth speed gears, a third compound gear element free on the countershaft and constantly rotated by the drive shaft, the latter gear element including fifth and sixth speed gears, a compound gear element shiftable on the driven shaft having gears respectively engageable with the first and second speed gears selectively, another compound gear element shiftable upon the driven shaft and including gears respectively engageable with the third and fourth speed gears selectively, and a third compound gear element shiftable upon the driven shaft and including gears respectively engageable with the fifth and sixth speed gears selectively.

6. In a speed gearing, the combination of a drive shaft, a driven shaft, a countershaft constantly rotated by the drive shaft, a compound gear element fixed upon the countershaft and including first and second speed gears, another compound gear element fixed on the countershaft and including third and fourth speed gears, a compound gear element shiftable upon the driven shaft and including gears respectively engageable with the first and second speed gears selectively, another compound gear element upon the driven shaft and including gears respectively engageable with the third and fourth speed gears selectively, and control means common to the compound gear elements on the driven shaft for shifting such gear elements.

7. In a speed gearing, the combination of a drive shaft, a driven shaft, a countershaft constantly rotated by the drive shaft, a compound gear element fixed on the countershaft and including first and second speed gears, another compound gear element fixed upon the countershaft and including third and fourth speed gears, a third compound gear element free on the countershaft and constantly rotated by the drive shaft, the latter gear element including fifth and sixth speed gears, a compound gear element shiftable on the driven shaft having gears respectively engageable with the first and second speed gears selectively, another compound gear element shiftable upon the driven shaft and including gears respectively engageable with the third and fourth speed gears selectively, a third compound gear element shiftable upon the driven shaft and including gears respectively engageable with the fifth and sixth speed gears selectively, and control means common to the compound gear elements on the driven shaft for shifting such gear elements.

In testimony whereof we affix our signatures.

PAUL E. BOTTINELLI. [L. S.]
MAURICE ARRIGHI. [L. S.]